(12) United States Patent
Flynn

(10) Patent No.: US 12,194,913 B2
(45) Date of Patent: Jan. 14, 2025

(54) GLOBAL HEADLAMP

(71) Applicant: Tesla, Inc., Austin, TX (US)

(72) Inventor: Robert Flynn, San Francisco, CA (US)

(73) Assignee: Tesla, Inc., Austin, TX (US)

( * ) Notice: Subject to any disclaimer, the term of this patent is extended or adjusted under 35 U.S.C. 154(b) by 54 days.

(21) Appl. No.: 18/005,556

(22) PCT Filed: Jul. 28, 2021

(86) PCT No.: PCT/US2021/043527
§ 371 (c)(1),
(2) Date: Jan. 13, 2023

(87) PCT Pub. No.: WO2022/026594
PCT Pub. Date: Feb. 3, 2022

(65) Prior Publication Data
US 2023/0256897 A1     Aug. 17, 2023

Related U.S. Application Data

(60) Provisional application No. 63/058,876, filed on Jul. 30, 2020.

(51) Int. Cl.
*B60Q 1/14* (2006.01)
*B60Q 1/08* (2006.01)

(52) U.S. Cl.
CPC ............. *B60Q 1/143* (2013.01); *B60Q 1/085* (2013.01); *B60Q 2300/331* (2013.01); *B60Q 2300/43* (2013.01); *B60Q 2300/45* (2013.01)

(58) Field of Classification Search
CPC ................................ B60Q 1/143; B60Q 1/085
See application file for complete search history.

(56) References Cited

U.S. PATENT DOCUMENTS 5,247,440 A * 9/1993 Capurka ................ B60Q 1/143
701/49
5,592,146 A * 1/1997 Kover, Jr. .............. B60Q 1/143
315/83
(Continued)

FOREIGN PATENT DOCUMENTS

DE       102013104276       10/2014
DE       102016003814        9/2017
(Continued)

OTHER PUBLICATIONS

International Search Report and Written Opinion dated Nov. 1, 2021 in application No. PCT/US21/43527.
(Continued)

*Primary Examiner* — Bryon T Gyllstrom
(74) *Attorney, Agent, or Firm* — Schwegman Lundberg & Woessner, P.A.

(57) ABSTRACT

Systems and methods for a global headlamp. An example method includes obtaining configuration information indicative of a jurisdiction associated with a vehicle. Headlamp state information is accessed which includes multiple headlamp states. A current headlamp state of the multiple headlamp states is determined based on the configuration information. A propagation is output via a pixelated light source in a headlamp of the vehicle, the propagation representing a particular beam pattern which is compliant with the jurisdiction.

20 Claims, 14 Drawing Sheets

(56) References Cited

U.S. PATENT DOCUMENTS

| | | | | |
|---|---|---|---|---|
| 7,604,383 | B2* | 10/2009 | Lambert | B60Q 1/26 362/523 |
| 10,773,635 | B1* | 9/2020 | Adams-Campos | B60Q 1/0076 |
| 2004/0114379 | A1* | 6/2004 | Miller | B60Q 1/085 362/465 |
| 2005/0073853 | A1* | 4/2005 | Stam | B60Q 1/085 362/503 |
| 2008/0002420 | A1* | 1/2008 | Lambert | F21S 41/62 362/543 |
| 2012/0299476 | A1 | 11/2012 | Roberts et al. | |
| 2013/0051618 | A1* | 2/2013 | Foltin | B60Q 1/085 382/103 |
| 2013/0258689 | A1 | 10/2013 | Takahira et al. | |
| 2015/0360601 | A1* | 12/2015 | Chambers | B60Q 1/085 701/49 |
| 2017/0273159 | A1 | 9/2017 | Akselrod et al. | |
| 2021/0291720 | A1* | 9/2021 | Kulkarni | B60Q 1/12 |

FOREIGN PATENT DOCUMENTS

| | | |
|---|---|---|
| EP | 1433655 | 6/2004 |
| EP | 1573479 | 10/2018 |
| WO | WO 21/262835 | 12/2021 |
| WO | 2022026594 | 2/2022 |

OTHER PUBLICATIONS

"International Application Serial No. PCT US2021 043527, International Preliminary Report on Patentability mailed Feb. 9, 2023", 7 pgs.

"European Application Serial No. 21851343.0, Extended European Search Report mailed Jun. 3, 2024", 8 pgs.

* cited by examiner

GLOBAL HEADLAMP

CROSS-REFERENCE TO RELATED APPLICATIONS

This application claims priority to U.S. Provisional Patent Application No. 63/058,876, filed Jul. 30, 2020, the content of which is hereby expressly incorporated by reference in its entirety.

TECHNICAL FIELD

The present disclosure relates to a vehicle headlamp. More specifically, this disclosure relates to a region-adjustable vehicle headlamp.

BACKGROUND

Headlamps, such as headlights on a front of a vehicle, are a fundamental tool to enhance safety of persons within the vehicle and also outside of the vehicle. For example, light from the vehicle's headlamps allows for illumination of the world to enhance visibility for persons within the vehicle. As another example, the light allows for identification of the vehicle by persons outside of the vehicle as the vehicle moves about the world. This dual purpose of the headlamp (e.g., seeing and being seen) may inform a particular propagation (e.g., beam pattern or projection) of the light output by each headlight. As an example, a vehicle's headlamps may project asymmetric light to illuminate proceeding vehicles and pedestrians while substantially minimizing glare to oncoming traffic.

Different jurisdictions, such as countries or geographical regions, have different regulatory agencies or standard settings organization which specify regulations regarding these projections. As an example, European vehicles have headlights which conform to regulations specified by the Economic Commission for Europe (ECE). As another example, vehicles in the United States have headlights which conform to the Federal Motor Vehicle Safety Standards specified by the National Highway Traffic Safety Administration (NHTSA). In this example, United States vehicles may use headlamp propagations as defined by FMVSS108.

Due to these jurisdictional differences, global vehicle entities manufacture different headlamps for the different jurisdictions. For example, different jurisdictional regulations may be in conflict with each other, such that different headlamps are required for the different jurisdictions. Additionally, within a single jurisdiction there may be variation due to the handedness of the driver. As an example, certain countries within the European Union (e.g., the United Kingdom, Ireland) drive on the left side of the road while certain other countries in the European Union (e.g., Germany, France) drive on the right side of the road.

SUMMARY

The systems, methods, and devices of this disclosure each have several innovative aspects, no single one of which is solely responsible for all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

One embodiment is a computer-implemented method performed by a headlamp controller included in a vehicle. The headlamp controller may be configured to control a headlamp of the vehicle by a method that includes: obtaining configuration information indicative of a jurisdiction associated with the vehicle; accessing headlamp state information comprising a plurality of headlamp states; determining a current headlamp state of the plurality of headlamp states based on the configuration information; and causing outputting, via a pixelated light source in the headlamp, of a propagation based on the current headlamp state, the propagation representing a particular beam pattern which is compliant with the jurisdiction.

Another embodiment is a vehicular system for propagating light that complies with requirements of multiple jurisdictions. The system may include: a memory storing headlamp state information for a plurality of jurisdictions and a selection of a current jurisdiction; a controller that reads the selected current jurisdiction and the headlamp state information associated with the selected jurisdiction; and a plurality of emissive elements configured to output propagations that are compliant with the selected jurisdiction based on the headlamp state information.

Yet another embodiment is a headlamp controller included in a vehicle, the headlamp controller controlling a headlamp of the vehicle, and the headlamp controller comprising one or more processing elements which are configured to: obtain configuration information indicative of a jurisdiction associated with the vehicle; determine a current headlamp state based on the configuration information; and cause outputting, via a pixelated light source in the headlamp, of a propagation based on the current headlamp state, the propagation representing a particular beam pattern which is compliant with the jurisdiction.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1A:
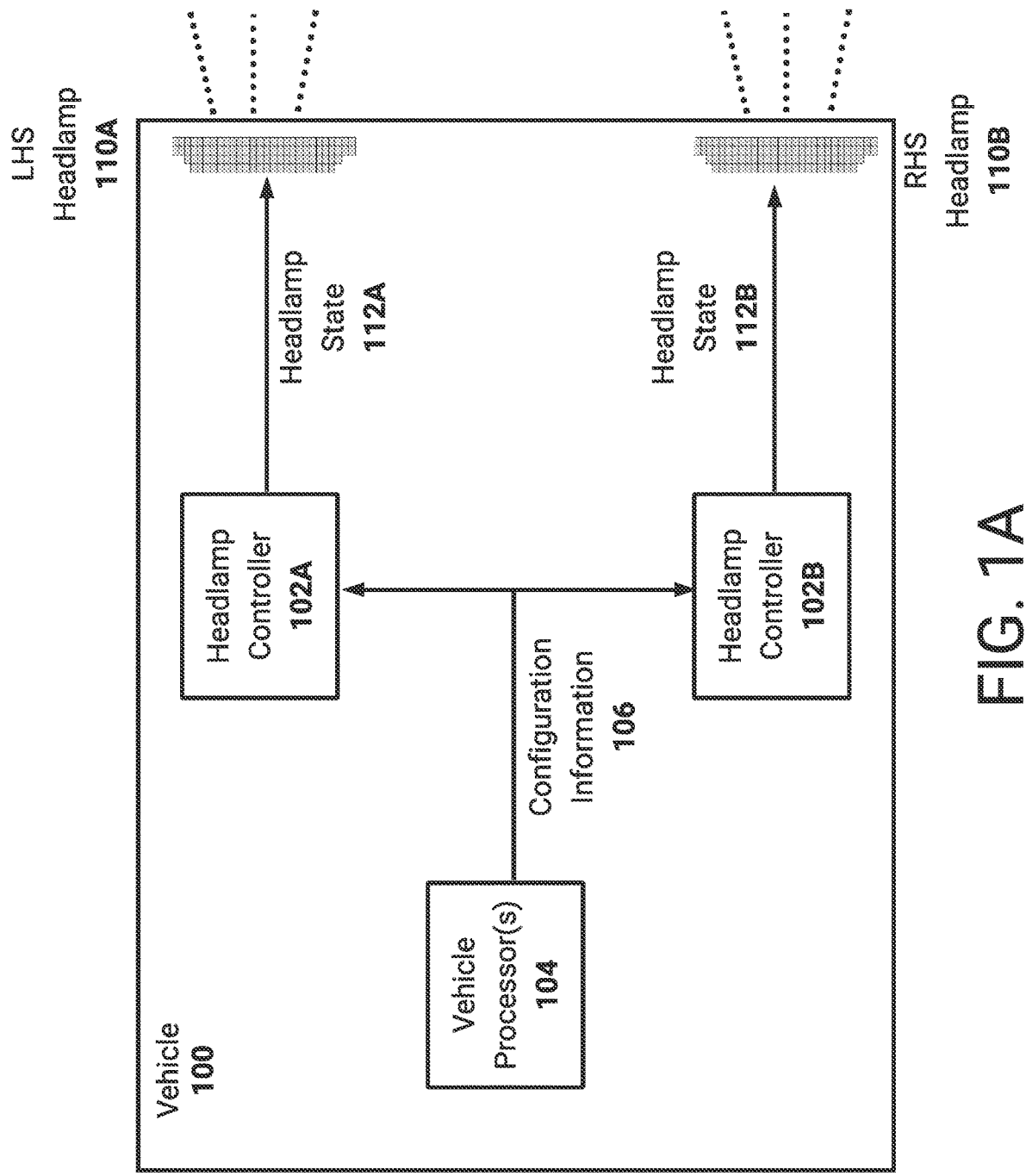
FIG. 1A illustrates a block diagram of an example vehicle setting headlamp states based on configuration information indicative of a jurisdiction.

This specification describes, among other things, a global headlamp which is usable in any, or substantially any, of the world's countries. As will be described, the global headlamp may use a pixelated light source as its light source. In some embodiments, the pixelated light source may represent an arrangement of emissive elements. For example, the pixelated light source may have a threshold number of rows (e.g., 3 rows, 4, rows, 5 rows) each with a particular number of emissive elements. In this example, the rows may have a same, or different, number of emissive elements. An example embodiment of the pixelated lights source described herein with respect to FIG. 1B has four rows, in which a first and second row have 28 emissive elements (e.g., rows 116A, 116B), a third row has 24 emissive elements (e.g., row 116C), and a fourth row has 22 emissive elements (e.g., row 116D). In some embodiments, each emissive element may be separately addressable or may be addressable in groups.

The global headlamp described above may output light which complies with the requirements for automobile beam patterns specified by regulatory agencies of different jurisdictions. Light which forms a particular beam pattern, beam shape, projection, and so on, is referred to herein as a propagation. As an example, the global headlamp may be configured to output a first low-beam propagation used by vehicles in the United States and complying with automobile or other vehicle regulatory requirements of the United States. As another example, the global headlamp may be configured to output a second low-beam propagation used by vehicles in the European Union and complying with regulatory requirements for vehicles in the European Union. Thus, and as may be appreciated, a jurisdiction may set requirements for one or more countries or regions associated with the jurisdiction.

Outputting these different propagations, which are in compliance with different regulatory agencies, may be satisfied via control of the emissive elements in the pixelated light source. With respect to the first propagation, a first subset of the emissive elements may be used to output light. Each emissive element in the first subset may output light with a particular intensity or intensity relative to each other. Intensity may represent, in some embodiments, luminous intensity. As may be appreciated, the particular intensity of an LED may be adjusted according to the current through the LED (e.g., the luminous intensity may be adjusted). With respect to the second propagation, a second subset of the emissive element maybe used to output light. This second subset may include different emissive elements as compared to the first subset. Optionally, the second subset may include the same emissive elements as the first subset and output light with different intensities or relative intensities as compared to the emissive elements in the first subset.

In one embodiment, a headlamp controller of a vehicle may be used to update a headlamp's propagation in substantially real-time. As referred to herein, the headlamp controller may update a headlamp state which indicates a particular propagation to be used. For example, the headlamp controller may determine that the vehicle is in a first jurisdiction (e.g., the United Kingdom). In this example, the vehicle may travel to a second jurisdiction (e.g., France). Optionally, the headlamp controller may obtain configuration information indicative of a headlamp state. Example configuration information may include a location of the vehicle. Based on the configuration information, the vehicle may update the headlamp state to be associated with the second jurisdiction. While a first and second jurisdiction are described above, in some embodiments a same jurisdiction may set different requirements for countries or regions associated with the jurisdiction. For example, a jurisdiction may set requirements for a first country which drives on the left hand side of the road which may be distinct from requirements for a second country which drives on the right hand side of the road.

In this way, the techniques described herein enable a global headlamp capable of being used around the world. The global headlamp may therefore simplify the manufacturing of a vehicle, since the same headlamp may be utilized in any country. For example, a bill of materials may be reduced from three or more light source variants to one light source (e.g., the pixelated light source). Additionally, the headlamp controller may allow for an enhanced user experience when utilizing a vehicle. For example, the headlamp controller may allow for seamless transitions between jurisdictions. As another example, the headlamp controller may allow an employee of a manufacturer to easily specify a headlamp state prior to delivery to a buyer. In this way, vehicles may be shipped around the world without physical alteration of the vehicle's headlamp.

Block Diagrams

FIG. 1A illustrates a block diagram of an example vehicle 100 setting headlamp states 112A-B of headlamps 110A-110B based on configuration information 106 indicative of a jurisdiction. The headlamps 110A-110B may use pixelated light sources as will be described in FIG. 1B. The vehicle 100 may include a vehicle processor 104 to control functionality or operation of the vehicle 100. For example, the processor 104 may provide information to one or more other systems included in the vehicle 104 (e.g., via one or more data buses). In this example, the other systems may relate to heating, ventilation, and air condition (HVAC) functionality, self-driving functionality, electric vehicle battery monitoring/control, and so on. The processor 104 may additionally obtain information from one or more sensors (e.g., global navigation satellite system sensor, camera), one or more antennas, and so on.

In the illustrated embodiment, the vehicle 100 further includes headlamp controllers 102A-102B which control respective headlamps 110A-110B on the vehicle 100. The headlamp controllers 102A-102B may represent processing elements (e.g., processors, FPGAs, ASICs, and so on). The headlamp controllers 102A-102B may also represent the electronic control unit (ECU) described in U.S. Prov. App. No. 63/043,467, and International Application No. PCT/US2021/038658, which are hereby incorporated herein by reference in their entirety. In some embodiments, one headlamp controller may be used to control the headlamps 110A-110B.

The headlamp controllers 102A-102B may set current headlamp states 112A-112B for the headlamps 110A-110B. As described above, a headlamp state may cause a headlamp to output a particular propagation. For example, the headlamp state may cause the headlamp to output light which projects a particular beam pattern. The headlamp controllers 102A-102B may specify headlamp states 112A-112B from a multitude of states. The headlamp states may represent permutations which cause a headlamp to output a propagation which is compliant with a particular jurisdiction's regulatory rules. The multitude of states may therefore represent all headlamp states which are compliant with any jurisdiction's regulatory rules. For example, headlamp controller 102A may cause headlamp 110A to output a low-beam propagation which is compliant with regulatory rules in the United States. As another example, headlamp controller 102A may cause headlamp 110A to output a high-beam propagation which is compliant with those same rules.

To specify the headlamp states 112A-112B, in some embodiments the headlamp controllers 102A-102B may use configuration information 106. The configuration information 106 may be indicative of a jurisdiction, such that the headlamp states 112A-112B may be in compliance with the jurisdiction. Example configuration information 106 may include a current location of the vehicle 100 (e.g., based on GNSS information received from the vehicle processor 104 and/or a GNSS sensor). For this example configuration information 106, the headlamp controllers' 102A-102B may select headlamp states 112A-112B which are compliant with a jurisdiction which regulates the location. The headlamp states 112A-112B may also be specific to a low-beam or high-beam state.

Configuration information 106 may also include a homologation region associated with the vehicle 100. For example, the homologation region may represent a summary of countries which enforce specific rules (e.g., countries in a same jurisdiction). Homologation region may be based on a country variable to logically select applicable states (also referred to as a country code). In some embodiments, the homologation region may be set during manufacture of the vehicle 100. For example, a country variable may be set for the vehicle or another identifier indicative of a jurisdiction. Thus, the headlamp controllers 102A-102B may select headlamp states 112A-112B which are compliant with the homologation region. In this way, manufacturing of the vehicle 100 may be simplified. For example, the same headlamp controllers 102A-102B and headlamps 110A-110B may be used to manufacture vehicles regardless of region.

During manufacture, the above-described homologation region may be specified to cause a vehicle to conform to regulations in one of the regions. In some embodiments, the homologation region may be stored in a protected portion of memory or stored in a read-only memory of the vehicle processor 104. Optionally, to adjust the homologation region (e.g., as described in FIG. 3) a particular password, authentication key, private key, and so on may be required.

In some embodiments the vehicle 100 may determine that its current location is outside of the specified homologation region. For example, a driver of the vehicle 100 may have driven, or otherwise transported, the vehicle 100 to a country in a different homologation region. In this example, the vehicle 100 may obtain location information via a global navigation satellite system (GNSS) location. Based on the GNSS location, the vehicle 100 may identify that the vehicle 100 is in a different homologation region. In some embodiments, the vehicle 100 may provide its location to an outside system via a network (e.g., via a cellular network or Wi-Fi). In response, the outside system may indicate a homologation region for the vehicle's 100 location.

The vehicle 100 may thus identify that different headlamp states 112A-112B should be selected, such that the vehicle is compliant with regulations of the different homologation region (e.g., different jurisdiction). The vehicle 100 may automatically update the headlamp states 112A-112B and may optionally present information to the user indicating the updating. Optionally, the vehicle 100 may request that the driver confirm that the headlamp states 112A-112B are to be updated. For example, the vehicle 100 may include a display which is responsive to user input. In this example, the vehicle processor 104 may cause presentation of a user interface via the display. The user interface may request that the driver confirm the headlamps 110A-110B are to output different propagations. In some embodiments, the user interface may present a graphical depiction of the different propagations (e.g., as compared to a current propagation). As an example, the user interface may present the example illustrations in FIGS. 4A-4C in contrast to FIGS. 5A-5C. In this way, the driver may view a difference between low-beam propagations between, for example, the United States and Europe.

The headlamp states 112A-112B may thus cause the headlamps 110A-110B to output propagations which satisfy regulations for a particular jurisdiction. In addition, the headlamp states 112A-112B may cause the propagations to be either low-beam propagations or high-beam propagations. For example, the driver of the vehicle 100 may provide input to the vehicle 100 to indicate that either high-beams or low-beams are to be utilized. As another example, the vehicle processor 104 may identify when to use high-beams or low-beams (e.g., the processor 104 may implement an automatic high beam). For example, if there is no oncoming traffic the vehicle processor 104 may select high-beams. In this example, if oncoming traffic is detected by the vehicle processor 104 (e.g., via a radar or camera), then low-beams may be selected.

In addition to causing output of particular propagations, the headlamp controllers 102A-102B may enforce secondary requirements. Example secondary requirements may include fault states defined by regulatory agencies associated with a jurisdiction. The headlamp controllers 102A-102B may therefore ensure that the headlamps conform to any such defined fault states.

For example, and with respect to a particular jurisdiction (e.g., Europe), if the light source for the headlamps experiences a failure then the headlamps can potentially still output propagations. As an example, the headlamps may still be allowed to operate if a portion of the emissive elements in a pixelated light source experience failure (e.g., cease outputting light or have reduced light). For this example, the headlamp controllers 102A-102B may determine if the remaining functional emissive elements still meet requirements associated with the jurisdiction. If so, the headlamp controllers 102A-102B may output headlamp states 112A-112B which cause the headlamps 110A-110B to output light. Optionally, the vehicle processor 104 may update a display to indicate that the headlamps 110A-110B are experiencing failure or error. However, if the headlamp controllers 102A-102B identify that the remaining emissive elements are unable to satisfy the requirements, the controllers 102A-102B may turn off the headlamps. Similarly, the vehicle processor 104 may update the display to indicate that the headlamps 110A-110B are unable to function and that the driver should call for assistance.

As another example of secondary requirements, the headlamp controllers 102A-102B may enforce combinations of lighting. For example, in a first jurisdiction (e.g., the United States) it may not be allowed to have high-beams and fog beams activated at a same time. In this example, the headlamp controllers 102A-102B may therefore disallow fog beams when high-beams are activated. In contrast, in a second jurisdiction (e.g., Europe) this combination may be allowed. The headlamp controllers 102A-102B may therefore ensure that such secondary requirements are satisfied regardless of jurisdiction in the world. In contrast, prior techniques relied upon hard-coded rules which implement a single jurisdiction's secondary requirements.

Figure 1B:
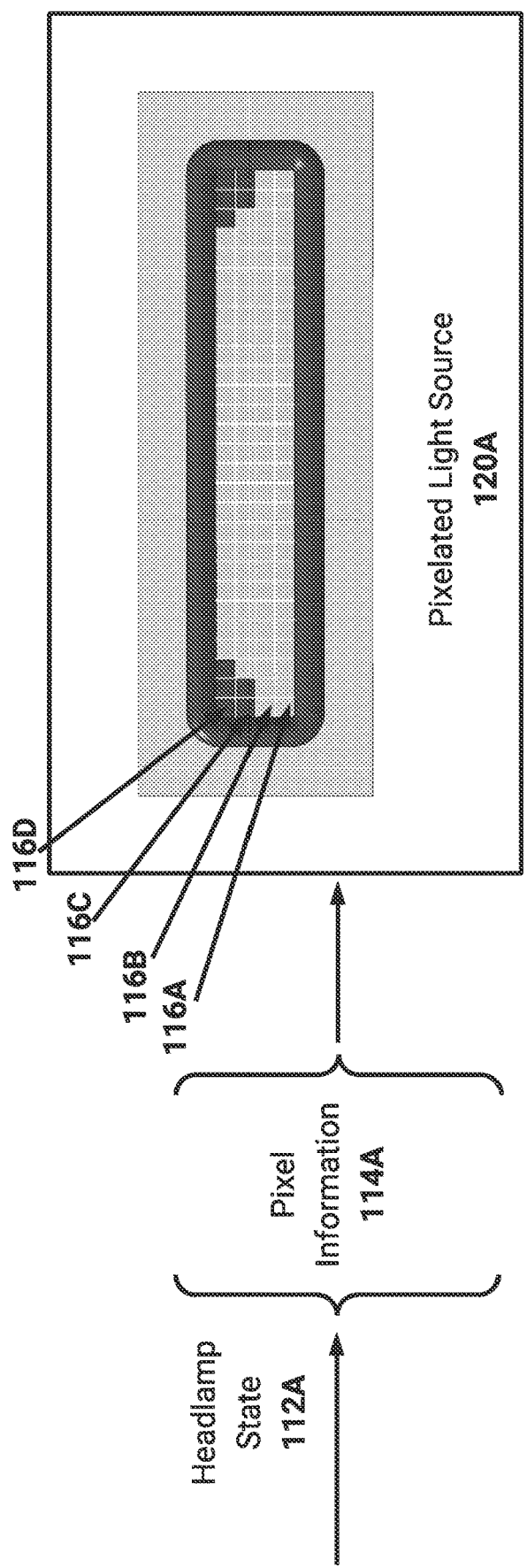
FIG. 1B illustrates a detailed view of an example pixelated light source for a headlamp.

FIG. 1B illustrates a detailed view of an example pixelated light source 120A for a headlamp 110A. The illustrated pixelated light source 120A includes an array of emissive elements (e.g., rows 1161A-116D). These emissive elements may be included on a printed circuit board (PCB) and light from the emissive elements may be provided to one or more optical elements for routing to a real-world environment. The illustrated headlamp may represent the left hand side (LHS) headlamp 110A of FIG. 1A. The pixelated light source 120A may be utilized, without modification, for either a left hand side or right hand side headlamp on a vehicle. In this way, manufacturing may be simplified due to the pixelated light source being used in both headlamps of a vehicle and being capable of working globally. A headlamp controller may cause a pixelated light source to output a particular propagation depending on which side of the vehicle the pixelated light is located. In some embodiments, a specific pixelated light source may be specific to a side of a vehicle.

Figure 4A:
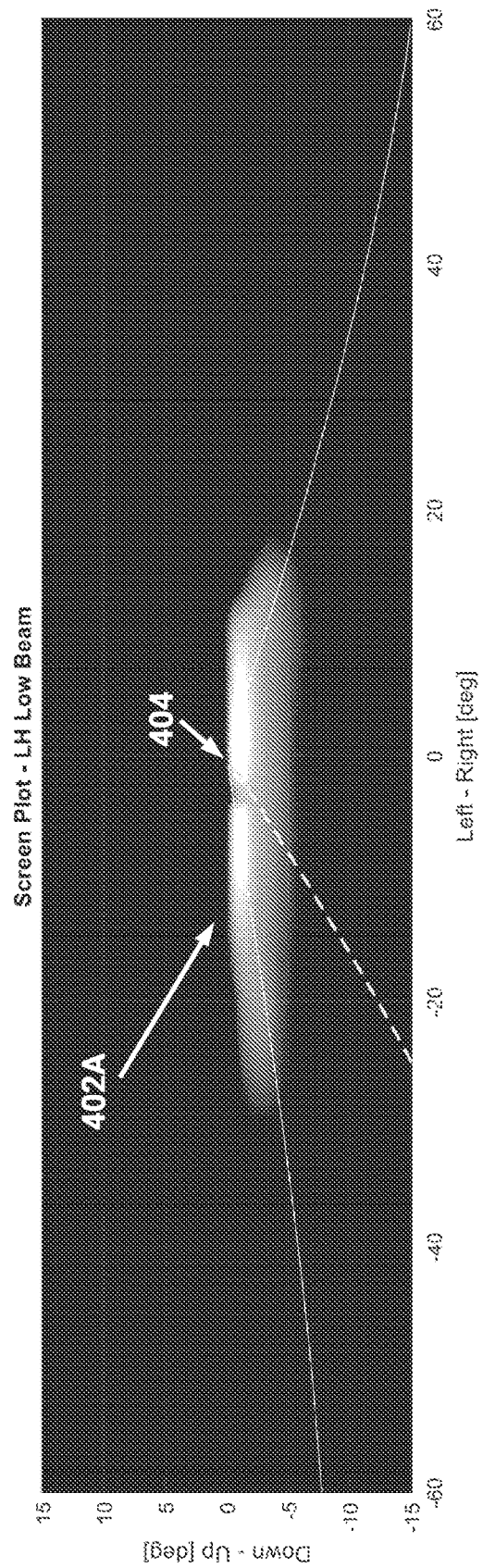
FIGS. 4A-4C illustrate an example low beam state generated by a pixelated light source which is compliant with a first jurisdiction.
Figure 4B:
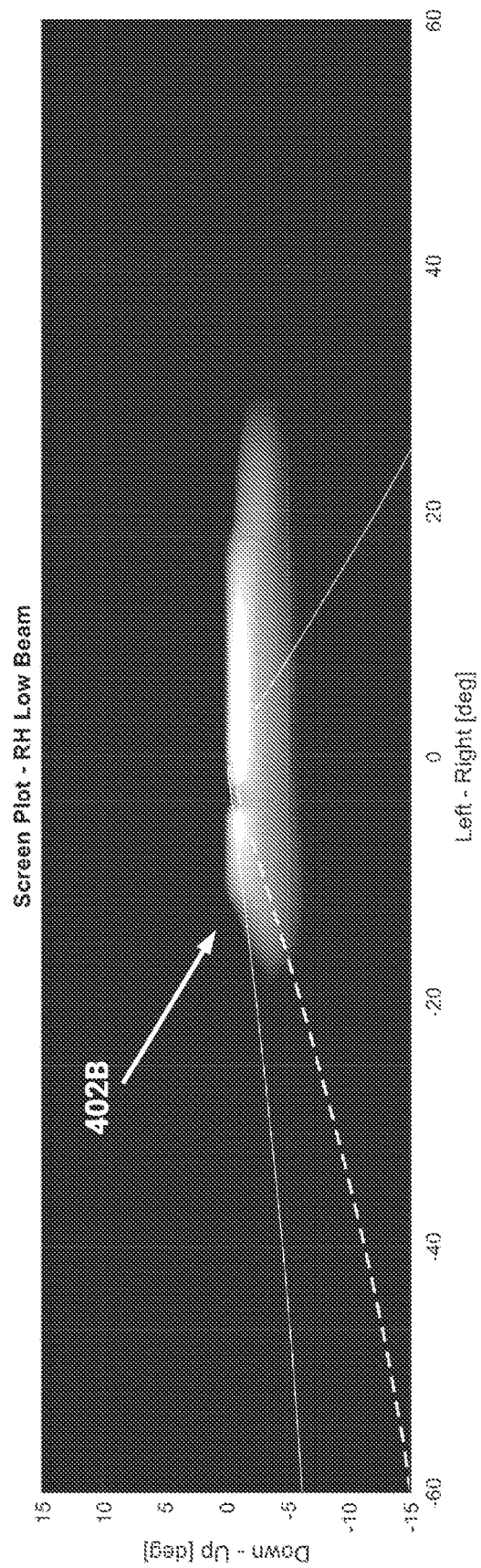
Figure 4C:
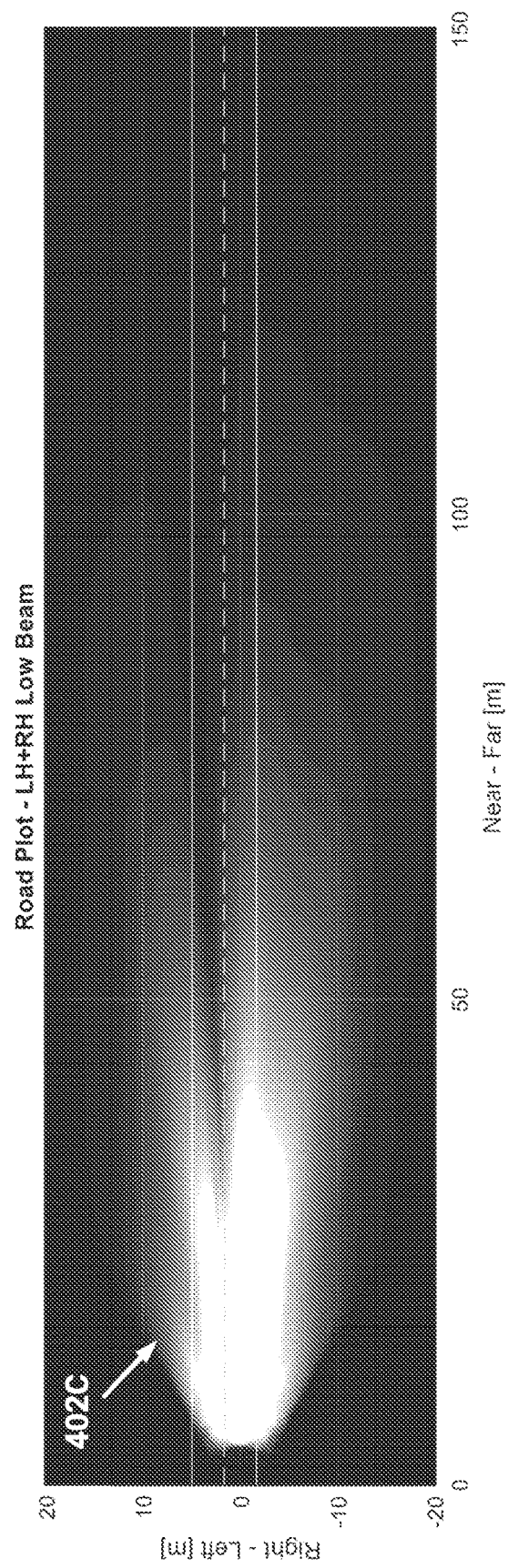

As described above, the headlamp state 112A may cause headlamp 110A to output a propagation which is compliant with a particular jurisdiction. The state 112A may also cause the headlamp 110A to output either a low-beam or high-beam propagation. Based on the state 112A, the pixelated light source 120A may cause activation of particular emissive elements to generate the propagation. Example activations of emissive elements for different propagations are illustrated in FIGS. 4A-4C. The emissive elements may include light emitting diodes (LEDs), micro-LEDs, organic LEDs, and so on. In some embodiments, a pixel (e.g., as described below) may be associated with a respective emissive element. In some embodiments, a pixel may be associated with a multitude of emissive elements (e.g., a multitude of micro-LEDs may form one pixel).

In some embodiments, the headlamp state 112A may indicate pixel information 114A. The headlamp state 112A may be provided via bus, such as a controller area network (CAN) bus, optionally via one or more messages on the bus. For example, headlamp controller 102A may have stored information indicating pixels which are to be used for any jurisdiction's propagation. In this example, the controller 102A may thus be able to define pixels for a high-beam or low-beam propagation which is compliant with a particular jurisdiction. The stored information may optionally be stored in a look up table (e.g., in volatile or non-volatile memory, such as in the headlamp controller or processor). The look up table may store values for each pixel utilized for a propagation. The values may indicate intensities, or relative intensities, for the pixels (e.g., luminous intensities). For example, the look up table may indicate values (e.g., luminous intensity values) of emissive elements for any headlamp state. Thus, the pixel information 114A may reflect values for the emissive elements of the pixelated light source 120A.

The pixel information 114A may additionally be specific to a particular side of the pixelated light source. In the illustrated embodiment, the pixel information 114A may reflect pixel values for a left hand side pixelated light source. As an example, a left hand side headlamp may output a propagation specific to the left hand side while a right hand side headlamp may output a propagation specific to the right hand side. Example propagations for a left hand side headlamp and a right hand side headlamp are illustrated in FIGS. 4A-4B.

The headlamp state 112A may be provided periodically, such as every threshold number of microseconds or milliseconds. The headlamp state 112A may optionally set values of registers associated with the emissive elements. Based on these values, certain shunts utilized by LED drivers may be selected. In this way, a subset of the emissive elements may be selected. Intensity of the light, such as luminous intensity, which is output by the emissive elements in the subset may be defined, as an example, by respective duty cycles associated with the LED drivers. Luminous intensity may also be defined, as an example, based on measures of continuous current being provided to respective emissive elements. Information regarding shunts and outputting intensities is included in U.S. Prov. App. No. 63/043,467 and International Application No. PCT/US2021/038658, which are hereby incorporated herein by reference in its entirety.

The headlamp state 112A may also be provided as information for the pixelated light source 120A to enforce. For example, the pixel information 114A may be analyzed by a processing element included in the pixelated light source 120A. The light source 120A may then cause a subset of the emissive elements to be activated. At a subsequent time, the headlamp state 112A may be updated and the light source 120A may enforce the update. For example, a driver or vehicle may select low-beam from a prior high-beam state. As another example, the vehicle may have been transported to a new jurisdiction.

Example rows 116A-116D of the pixelated light source 120A are illustrated. In some embodiments, a first two rows 116A-116B may be used for low-beam propagations. Optionally, a third and fourth row 116C-116D may be activated for high-beam propagations.

In some embodiments, there may be additional rows of emissive elements. Optionally, there may be rows with emissive elements which output light of different spectrums. For example, a certain row or a portion thereof may include emissive elements which output infrared or ultraviolet light. In this example, a vehicle processor (e.g., processor 104) may activate infrared lights based on a self-driving or autonomous mode being activated. In some embodiments, these non-visible, or substantially non-visible, emissive elements may be positioned above visible emissive elements. For example, row 116A may represent visible emissive elements and above that may be included a row of a same size which has non-visible emissive elements.

As described above, the pixel information 114A may correspond to luminous intensity values for the pixels of the pixelated light source 120A. In some embodiments, these pixel values may be modified by a scaling factor. For example, the vehicle 100 may detect that an ambient light outside is above a threshold measure. In this example, the pixel information 114A may be uniformly increased in intensity by a scaling factor. The scaling factor may optionally depend on jurisdiction. For example, a first jurisdiction may allow scaling (e.g., Europe, such as defined in ECE R123). The intensity values may additionally be updated based on the vehicle 100 turning. For example, certain emissive elements may be increased in intensity while other emissive elements are retained in intensity or reduced.

Example Flowcharts

Figure 2:
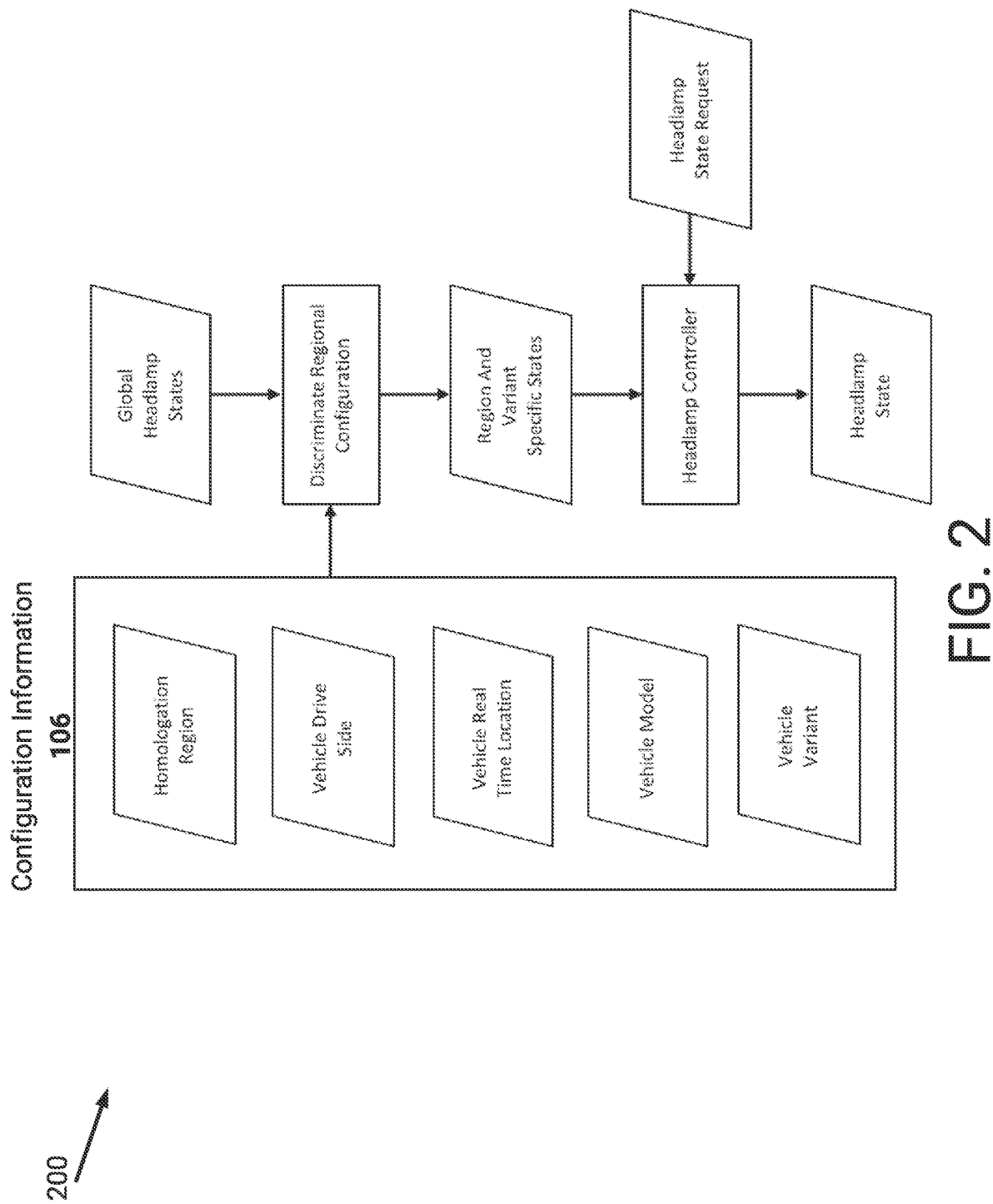
FIG. 2 illustrates an example process for setting a headlamp state based on configuration information.

FIG. 2 illustrates an example process 200 for setting a headlamp state based on configuration information. A headlamp controller may obtain configuration information 106 and use the information 106 to define a headlamp state. For example, the configuration information 106 may include a homologation region (e.g., jurisdiction) as described in FIG. 1A. The configuration information 106 may also include a vehicle drive side. As may be appreciated, a particular jurisdiction may allow for driving on both sides of the road depending on location within the particular jurisdiction. The configuration information 106 may further include the vehicle's current location according to an antenna or GNSS sensor. Configuration information 106 may further include vehicle model and variant. For example, the headlamp controller may be configured for use in a multitude of vehicle models.

Based on the configuration information 106, the headlamp controller may select a regional configuration based on stored information for all global headlamp states. As an example, the headlamp controller may identify that the vehicle is to use European regulations for a left-hand traffic vehicle. The headlamp controller may receive a headlamp state request and select the headlamp state as described in FIGS. 1A-1B.

As described above, the headlamp state may cause a particular propagation to be output by a headlamp. For example, the headlamp state may cause a headlamp to output a low-beam propagation which is compliant with a jurisdiction. In this example, a driver of the vehicle may have selected use of low-beams or the vehicle may have automatically selected low-beams. Additionally, the headlamp controller may enforce secondary requirements such as fault states as described above.

With respect to a propagation, the headlamp state may cause particular emissive elements of a pixelated light source to be utilized. Particular intensities, such as luminous intensities, for the emissive elements may be additionally be set. In this way, the pixelated light source may be configured to output a multitude of propagations to allow for global usage.

Figure 3:
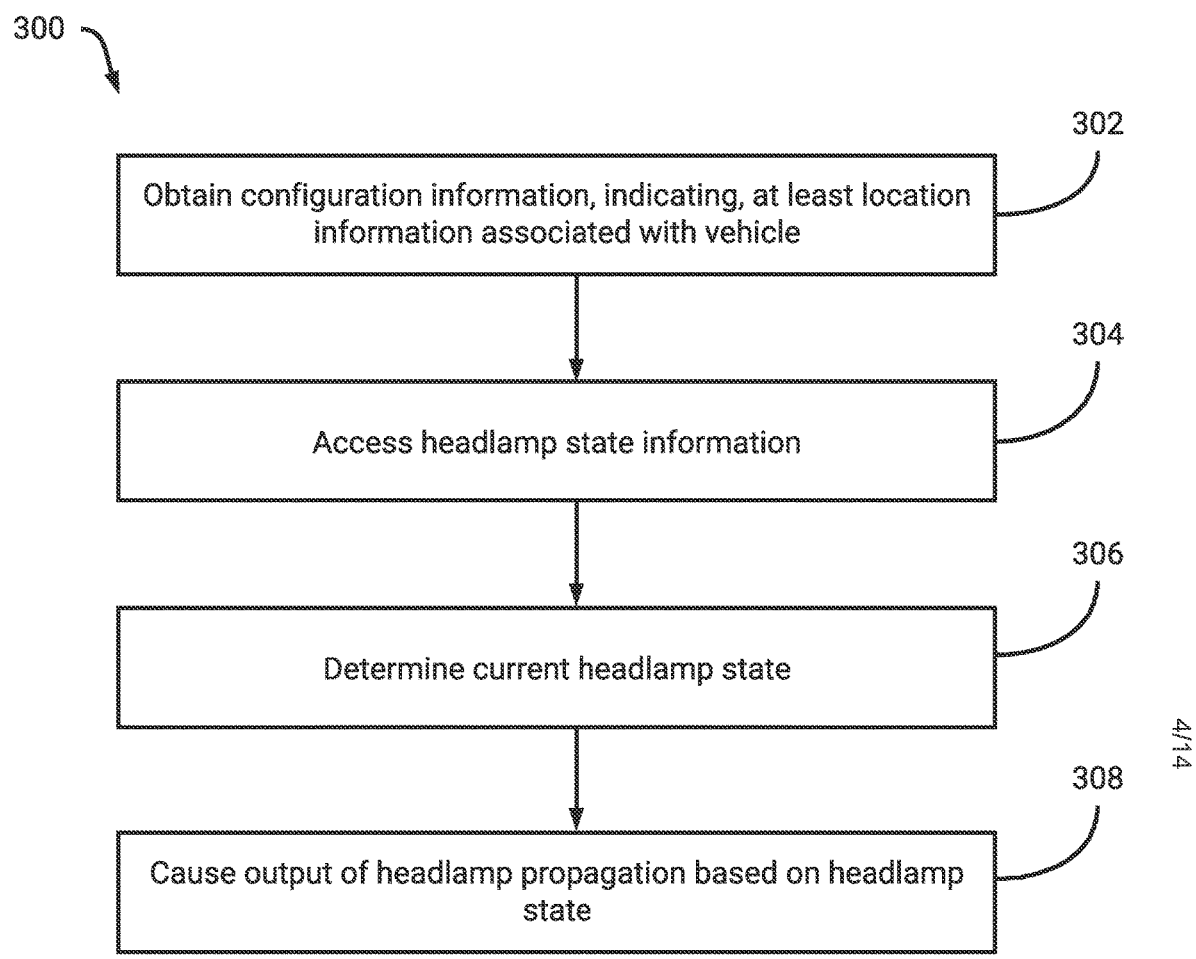
FIG. 3 illustrates an example process for a headlamp controller to cause output of light from a headlamp which confirms to a particular jurisdiction.

FIG. 3 illustrates an example process 300 for a headlamp controller to cause output of light from a headlamp which confirms to a particular jurisdiction. For convenience, this process 300 will be described as being performed by a headlamp controller (e.g., controller 110A). In some embodiments, vehicle processor 104 may provide information to a pixelated light source such that controller 110A is not utilized or required. Thus, in some embodiments vehicle processor 104 may perform some, or all, of the blocks included in process 300.

At block 302, the headlamp controller obtains configuration information. As described above, the configuration information may be provided by one or more vehicle processors. In some embodiments, certain configuration information may be defined during manufacture of a vehicle. For example, a homologation region may be set for the vehicle. As another example, the vehicle model, vehicle variant, and optionally vehicle drive side may be set during manufacture. Other configuration information, such as the real-time location, may be determined during use of the vehicle (e.g., by the vehicle processor 104 or headlamp controller).

The homologation region and/or drive side may thus be updated based on the real-time location. For example, if the vehicle is driven or transported to a different jurisdiction, the real-time location will reflect the different jurisdiction (e.g., as determined by the processor 104 or headlamp controller). The vehicle may then prompt the driver to confirm that the headlamps are to be updated accordingly. For example, the prompt may be provided via a user interface presented on a display included in the vehicle or the prompt may be provided via speech (e.g., the driver may respond affirmatively to the speech). Once updated, the vehicle may update the homologation region and/or drive side.

At block 304, the headlamp controller accesses headlamp state information. The headlamp controller may have access to headlamp state information in stored memory. For example, look up tables may be used to define pixel values for a multitude of propagations which are compliant with different jurisdictions.

At block 306, the headlamp controller determines a current headlamp state. The headlamp controller may determine a particular jurisdiction to which the headlamps are to conform. For example, the headlamp controller may determine a current location of the vehicle based on the configuration information (e.g., the processor 104 may determine the location and provide information to the headlamp controller usable to select a jurisdiction). Additionally, the headlamp controller may determine whether the low-beams or high-beams are activated. Based on this information, the headlamp controller may select a headlamp state which is compliant with the jurisdiction and which causes output of a compliant low-beam or high-beam propagation.

At block 308, the headlamp controller causes output of a headlamp propagation based on the headlamp state. The headlamp controller may cause activation of particular emissive elements in the pixelated light source to generate a particular propagation. In this way, the headlamp controller may allow for a left handed traffic low-beam propagation in a first jurisdiction to be output via a same headlamp as a right handed traffic high-beam propagation in a second jurisdiction.

As another example, the headlamp controller or vehicle processor may determine a beam shape which corresponds to a headlamp state for the homologation region and/or drive side. The beam shape may be translated by the processor or headlamp controller into particular pixels (e.g., luminous intensity values for the pixels). In some embodiments, the state information may be updated via over the air (OTA) updates.

The headlamp controller may optionally be specific to a side of the vehicle, such that the headlamp state is specific to the side of the vehicle (e.g., left side, right side). Optionally, the headlamp state may indicate propagations for the left side and rights ide and the headlamp controller may use the propagation for its corresponding side.

Example Propagations

FIGS. 4A-4C illustrate an example low beam state generated by a pixelated light source which is compliant with a first jurisdiction. In the illustrated embodiment, the example jurisdiction is the United States (e.g., FMVSS). FIGS. 4A-4C illustrate an example road with a vehicle driving on the right-hand side.

FIG. 4A illustrates a first headlamp using a pixelated light source outputting light 402A from a subset of emissive elements. In FIG. 4A the light source is outputting a low-beam propagation for the left hand side headlamp. The illustrated cutoff 404 may represent a transition for an illuminated area to a non-illuminated area. For example, the cutoff 404 may extend along an upper length of the propagation separation the illuminated and non-illuminated areas.

FIG. 4B illustrates a second headlamp using a pixelated light source outputting light 402B from a subset of emissive elements. In FIG. 4B the light source is outputting a low-beam propagation for the right hand side headlamp.

FIG. 4C illustrates a combination of the first headlamp and second headlamp of FIGS. 4A-4B. In the illustrated example, a propagation 402C associated with a low-beam state for the first jurisdiction is included.

Figure 5A:
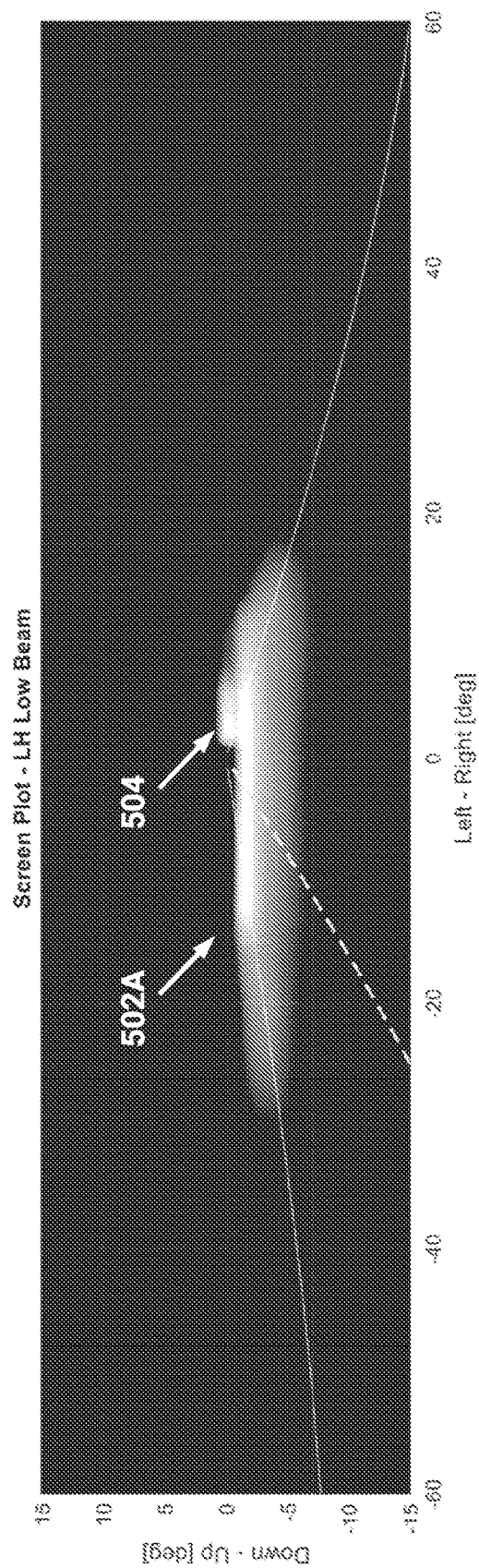
FIGS. 5A-5C illustrate an example low beam state generated by a pixelated light source which is compliant with a second jurisdiction.
Figure 5B:
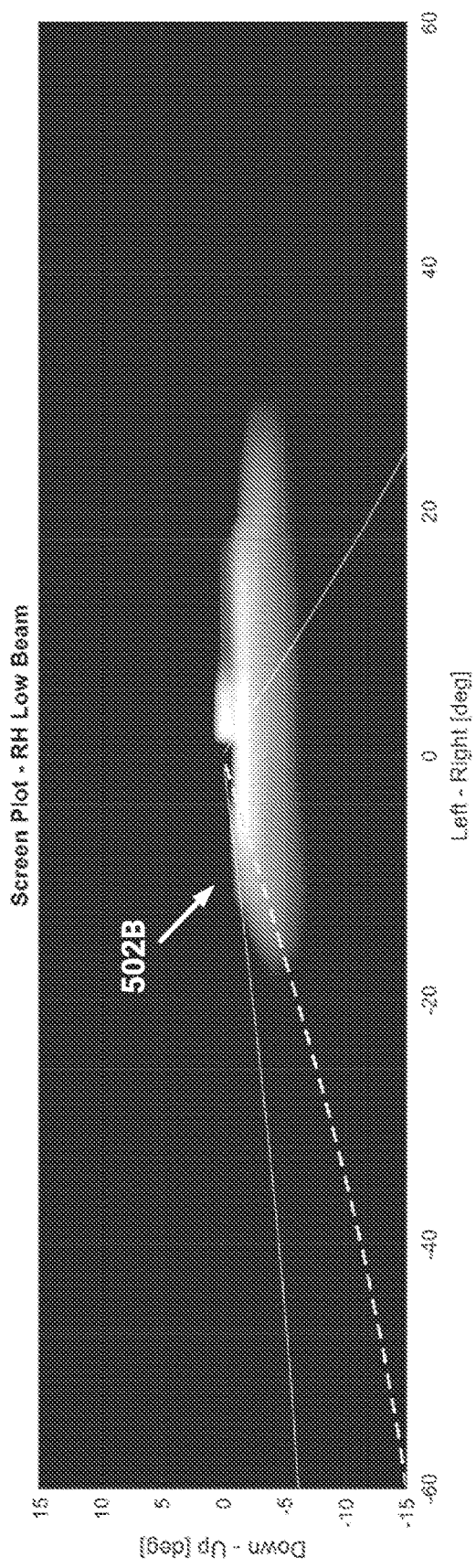
Figure 5C:
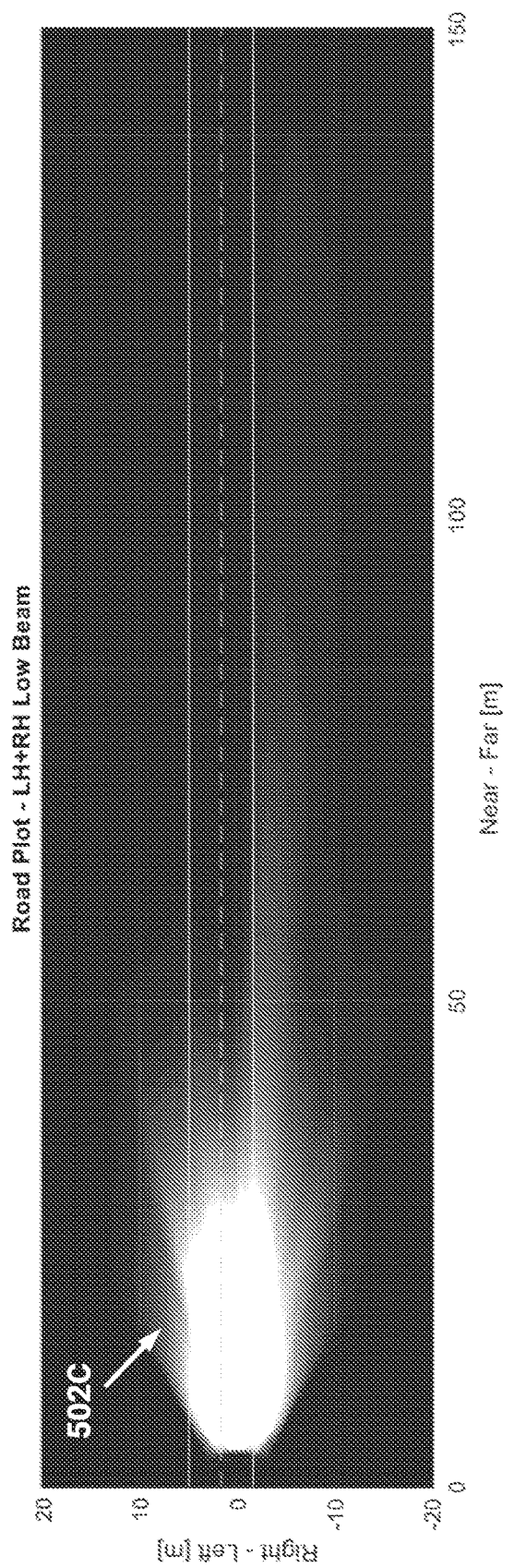

FIGS. 5A-5C illustrate an example low beam state generated by a pixelated light source which is compliant with a second jurisdiction. In the illustrated embodiment, the example jurisdiction is Europe for right-hand traffic driving. FIGS. 5A-5C thus illustrate an example road with a vehicle driving on the right-hand side.

FIG. 5A illustrates a first headlamp using a pixelated light source outputting light 502A from a subset of emissive elements. In FIG. 5A the light source is outputting a low-beam propagation for the left hand side headlamp. The illustrated cutoff 504 may represent a transition for an illuminated area to a non-illuminated area. For example, the cutoff 504 may extend along an upper length of the propagation separation the illuminated and non-illuminated areas.

FIG. 5B illustrates a second headlamp using a pixelated light source outputting light 502B from a subset of emissive elements. In FIG. 5B the light source is outputting a low-beam propagation for the right hand side headlamp.

FIG. 5C illustrates a combination of the first headlamp and second headlamp of FIGS. 5A-5B. In the illustrated example, a propagation 502C associated with a low-beam state for the second jurisdiction is included.

Figure 6A:
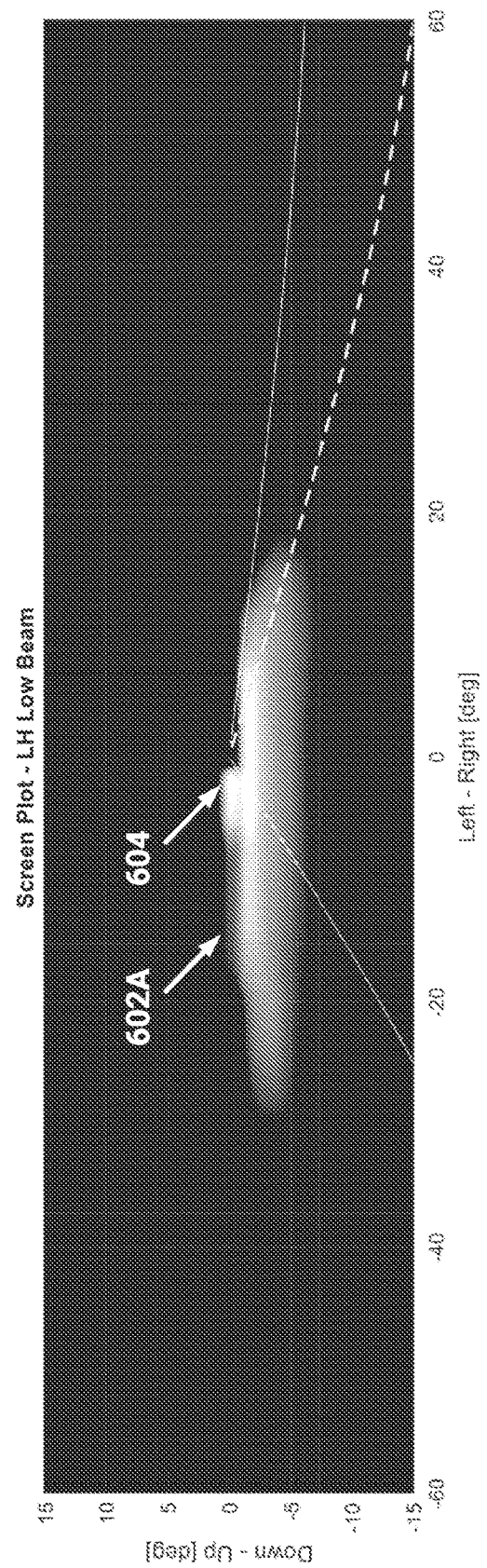
FIGS. 6A-6C illustrate an example low beam state generated by a pixelated light source which is compliant with a third jurisdiction.
Figure 6B:
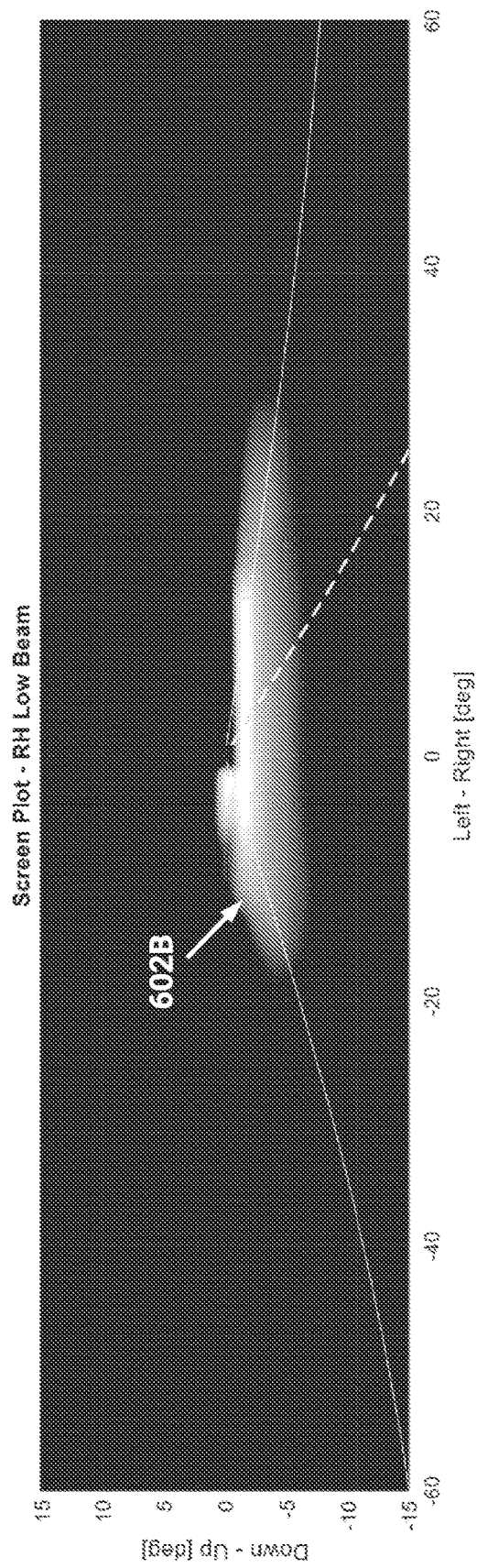
Figure 6C:
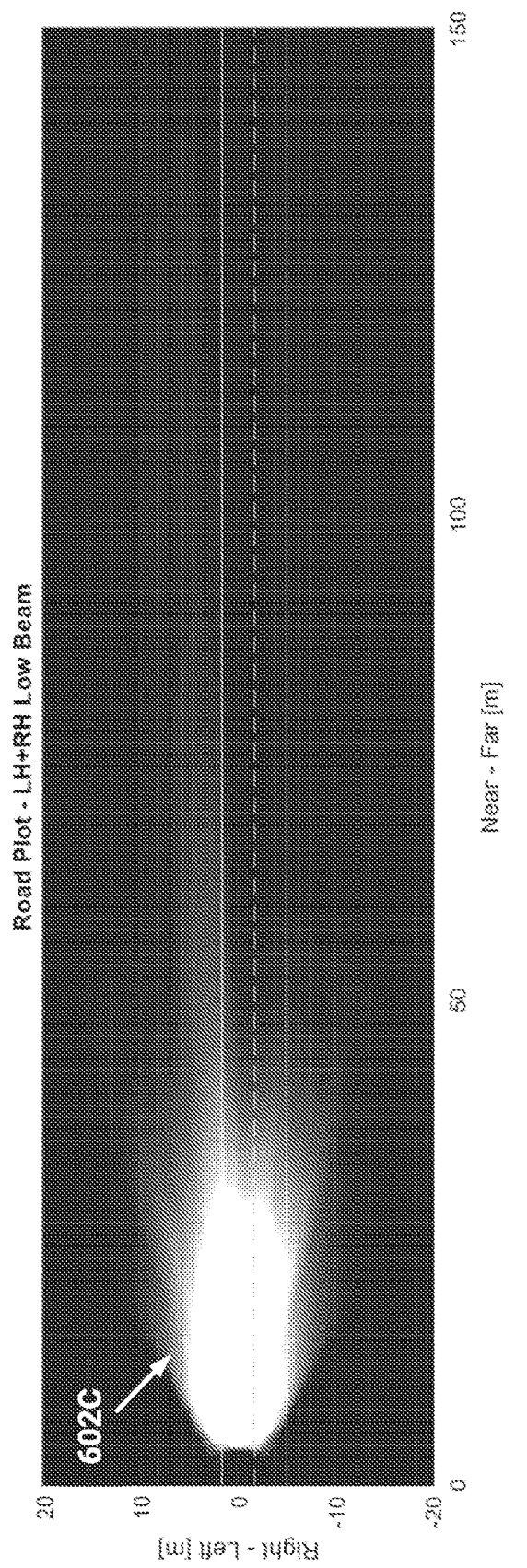

FIGS. 6A-6C illustrate an example low beam state generated by a pixelated light source which is compliant with a third jurisdiction. In the illustrated embodiment, the example jurisdiction is Europe (e.g., the same as the above-described second jurisdiction) but for left-hand traffic driving. FIGS. 6A-6C thus illustrate an example road with a vehicle driving on the left-hand side.

FIG. 6A illustrates a first headlamp using a pixelated light source outputting light 602A from a subset of emissive elements. In FIG. 6A the light source is outputting a low-beam propagation for the left hand side headlamp. The illustrated cutoff 604 may represent a transition for an illuminated area to a non-illuminated area. For example, the cutoff 604 may extend along an upper length of the propagation separation the illuminated and non-illuminated areas.

FIG. 6B illustrates a second headlamp using a pixelated light source outputting light 602B from a subset of emissive elements. In FIG. 6B the light source is outputting a low-beam propagation for the right hand side headlamp.

FIG. 6C illustrates a combination of the first headlamp and second headlamp of FIGS. 6A-6B. In the illustrated example, a propagation 602C associated with a low-beam state for the third jurisdiction is included.

Figure 7:
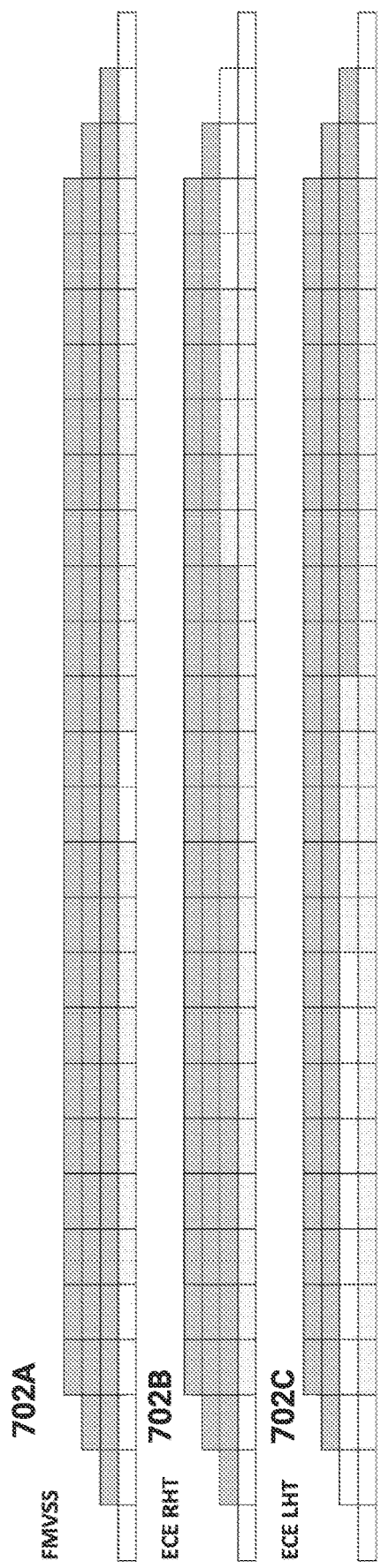
FIG. 7 illustrates an example pixelated light source outputting different low beam states.

FIG. 7 illustrates an example pixelated light source outputting different low beam states 702A-7042C. As illustrated, the low beam state 702A for the United States may include activation of emissive elements on a first row. The low beam states 702B-702C for Europe may include activation of emissive elements on a first and a second row.

While FIGS. 4A-4C, 5A-5C, and 6A-6C, illustrate example low-beam states, it may be appreciated that high-beam states may be generated by the pixelated lights source for different jurisdictions. The high-beam states, as an example, may include activation of emissive elements in the upper third and/or fourth rows of the pixelated light source.

Furthermore, in some embodiments the global headlamp described herein may represent a single headlamp positioned on a front of a vehicle. The single headlamp may include emissive elements which extend substantially across a front of the vehicle. Thus, the single headlamp may output light which forms propagations for both the left side and the right side of the vehicle.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method, the method performed by a headlamp controller included in a vehicle, the headlamp controller configured to control a headlamp of the vehicle, and the method comprising:
    obtaining configuration information indicative of a jurisdiction associated with the vehicle;
    accessing headlamp state information comprising a plurality of headlamp states;
    determining a current headlamp state of the plurality of headlamp states based on the configuration information, the current headlamp state indicating one or more luminous intensity values corresponding to one or more pixels of the headlamp;
    in response to determining that the configuration information indicates that the jurisdiction permits scaling of beam intensity, scaling an intensity of the one or more luminous intensity values by a scaling factor to generate one or more scaled luminous intensity values; and
    causing output, via a pixelated light source in the headlamp comprising the one or more pixels, of a propagation based on the one or more scaled luminous intensity values, the propagation representing a particular beam pattern which is compliant with the jurisdiction.

2. The method of claim 1, wherein the configuration information comprises one or more of a homologation region, a vehicle drive side, a current location of the vehicle, a vehicle model, or a vehicle variant.

3. The method of claim 1, wherein the headlamp state information comprises the plurality of headlamp states stored in respective look up tables, wherein the look up tables define the one or more luminous intensity values corresponding to the one or more pixels of the pixelated light source.

4. The method of claim 3, wherein the headlamp state information is specific to a side of the vehicle on which the headlamp is positioned.

5. The method of claim 1, wherein the current headlamp state is selected to be compliant with the jurisdiction.

6. The method of claim 1, wherein the current headlamp state is associated with a high-beam or low-beam propagation.

7. The method of claim 1, wherein the headlamp controller enforces secondary requirements for the jurisdiction.

8. The method of claim 1, wherein the pixelated light source comprises a plurality of emissive elements, and wherein the propagation is generated via light being output from a subset of the emissive elements.

9. The method of claim 1, wherein the pixelated light source is configured to output propagations which are compliant with a multitude of jurisdictions.

10. A vehicular system for propagating light that complies with requirements of multiple jurisdictions, comprising:
    a memory storing headlamp state information for a plurality of jurisdictions and a selection of a current jurisdiction, the headlamp state information for each jurisdiction indicating one or more luminous intensity values corresponding to one or more emissive elements;
    a controller that:
        reads the selected current jurisdiction and the headlamp state information associated with the selected jurisdiction; and
        in response to determining that the selected jurisdiction permits scaling of beam intensity, scales an intensity of the one or more luminous intensity values by a scaling factor to generate one or more scaled luminous intensity values; and
    a plurality of emissive elements, including the one or more emissive elements, configured to output propagations that are compliant with the selected jurisdiction based on the one or more scaled luminous intensity values.

11. The vehicular system of claim 10, wherein the memory stores the luminous intensity values in a look up table.

12. The vehicular system of claim 10, wherein the headlamp state information indicates a low-beam state or a high-beam state.

13. The vehicular system of claim 10, wherein the selection of the current jurisdiction is based on a current location of the vehicular system.

14. The vehicular system of claim 10, wherein the plurality of emissive elements are formed in a plurality of rows, and wherein the output propagations cause activation of a respective subset of the emissive elements.

15. The vehicular system of claim 14, wherein a first output propagation associated with a low-beam state for the selected current jurisdiction causes activation of first emissive elements included in a first threshold number of rows, and wherein a second output propagation associated with a high-beam state for the selected current jurisdiction causes activation of second emissive elements included a second threshold number of rows, and wherein the second threshold is greater than the first threshold.

16. A headlamp controller included in a vehicle, the headlamp controller controlling a headlamp of the vehicle, and the headlamp controller comprising one or more processing elements which are configured to:
obtain configuration information indicative of a jurisdiction associated with the vehicle;
determine a current headlamp state based on the configuration information, the current headlamp state indicating one or more luminous intensity values corresponding to one or more pixels of the headlamp;
in response to determining that the configuration information indicates that the jurisdiction permits scaling of beam intensity, scaling an intensity of the one or more luminous intensity values by a scaling factor to generate one or more scaled luminous intensity values; and
cause output, via a pixelated light source in the headlamp comprising the one or more pixels, of a propagation based on the one or more scaled luminous intensity values, the propagation representing a particular beam pattern which is compliant with the jurisdiction.

17. The headlamp controller of claim 16, wherein the configuration information comprises one or more of a homologation region, a vehicle drive side, a current location of the vehicle, a vehicle model, or a vehicle variant.

18. The headlamp controller of claim 16, wherein the processing elements access headlamp state information comprising a plurality of headlamp states stored in respective look up tables, wherein the current headlamp state is selected from the plurality of headlamp states, and wherein the look up tables define the one or more luminous intensity values.

19. The headlamp controller of claim 16, further comprising memory configured to store a plurality of headlamp states.

20. The headlamp controller of claim 16, further configured to enforce secondary requirements for the jurisdiction.

* * * * *